(12) United States Patent
Wilson

(10) Patent No.: US 8,572,631 B2
(45) Date of Patent: Oct. 29, 2013

(54) DISTRIBUTED CONTROL OF DEVICES USING DISCRETE DEVICE INTERFACES OVER SINGLE SHARED INPUT/OUTPUT

(75) Inventor: Gerald Philip Wilson, Camptonville, CA (US)

(73) Assignee: GVBB Holdings S.A.R.L., Luxembourg (LU)

( * ) Notice: Subject to any disclaimer, the term of this patent is extended or adjusted under 35 U.S.C. 154(b) by 372 days.

(21) Appl. No.: 13/001,008

(22) PCT Filed: Jun. 25, 2008

(86) PCT No.: PCT/US2008/007898
§ 371 (c)(1),
(2), (4) Date: Dec. 22, 2010

(87) PCT Pub. No.: WO2009/157896
PCT Pub. Date: Dec. 30, 2009

(65) Prior Publication Data
US 2011/0099557 A1    Apr. 28, 2011

(51) Int. Cl.
| G06F 9/455 | (2006.01) |
| G06F 3/00 | (2006.01) |
| G06F 9/44 | (2006.01) |
| G06F 9/46 | (2006.01) |
| G06F 13/00 | (2006.01) |

(52) U.S. Cl.
USPC ........... 719/314; 719/311; 719/312; 719/313; 719/320; 719/328; 718/1

(58) Field of Classification Search
None
See application file for complete search history.

(56) References Cited

U.S. PATENT DOCUMENTS 7,383,386 B1    6/2008    Iyer
2004/0216143 A1    10/2004    Boecker
2006/0248526 A1    11/2006    Rostampour
2008/0225760 A1*    9/2008    Iyer et al. ............... 370/310

FOREIGN PATENT DOCUMENTS

EP    1 513 057 A2    3/2005

OTHER PUBLICATIONS

International Search Report and Written Opinion dated Apr. 21, 2009 for International Application No. PCT/US2008/007898.
International Preliminary Examination Report EP Application No. 08 874 834.8—Europen Patent office—Munich Germany—Dec. 4, 2012.
International Preliminary Report on Patentability—PCT/US2008/007898—The International Bureau of WIPO—Geneva, Switzerland—Jan. 5, 2011.

* cited by examiner

*Primary Examiner* — Emerson Puente
*Assistant Examiner* — Jonathan R Labud
(74) *Attorney, Agent, or Firm* — Arent Fox LLP

(57) ABSTRACT

Systems and methods are provided for controlling a device. In one aspect, a method for controlling a device includes exposing a plurality of virtual device interfaces (13) for a device (11), wherein each virtual device interface (13) enables client control of a discrete function of the device, and controlling concurrent communication between the device (11) and two or more virtual device interfaces (13) operating on a single shared I/O connection (15) using a shared I/O port controlled by a device I/O module (12). The device I/O module (12) enables independent development of multiple device interfaces (13) that can seamlessly and independently operate on a single (physical) device communication connection (15), wherein the device shared I/O (input/output) module (12) implements functions to arbitrate and coordinate I/O activity between the device interfaces (13) and target device (11).

17 Claims, 1 Drawing Sheet

DISTRIBUTED CONTROL OF DEVICES USING DISCRETE DEVICE INTERFACES OVER SINGLE SHARED INPUT/OUTPUT

TECHNICAL FIELD

The present disclosure relates generally to systems and methods for accessing and controlling devices in a computing network using virtual device interfaces and, in particular, systems and methods for independently accessing and controlling discrete functionalities of a controlled device through separate virtual device interfaces utilizing a single shared deterministic I/O connection.

BACKGROUND

Technological innovations and developments in distributed computing systems and applications have led to a significant increase in the amount and variety of network computing devices and peripheral (hardware) devices that can be interconnected and remotely accessible over communications networks. In general, the functions of network devices can be accessed and controlled by client applications through some type of device interface. For example, a common approach for enabling application access and control of a multi-function device is by use of "virtual device interfaces" in which various functions of the device are exposed through discrete interfaces, where each virtual device interface is an abstraction of actual device functionality. A fundamental goal for a virtual device interface framework is to allow for generic device control code within the application which lends itself to specialization, (the grouping and segregation of specific functional domains), and to the ability of substituting "plug-in" simulators in lieu of the actual device interface. Indeed, it is preferable for the device interface code to maintain a strict hierarchal base that segregates discrete functional (virtual) device types and, thus, the APIs, which leads to more "code reuse," and standardized APIs.

As multi-function devices become more complex, however, the ability to abstract device functionality becomes more problematic at the level of both device interface development and application development, especially when deterministic behavior is required. For example, challenges that are faced at the device interface level include: 1. Mode selection—Operations for each of the discrete functionalities often require switching modes of operation with resulting increased complexity; 2. Priority inversion—The operation of a functional block of low importance preempting the operation of another functional block of higher importance; and 3. Increased complexity of device API.

Conversely, when developing an application that must make use of a device interface which combines several functionalities, the application developer is often required to "understand" the multi-function behavior of the "special device." A common approach to addressing this issue is to create an interface to the interface; one that must be "understood" at the user application level of operation. This direct method is problematic for various reasons. The most obvious being that the client application must include knowledge about a specific device type rather than a set of virtual device types. Ultimately, this knowledge leads to a mass of specialized device-specific code that should not be part of the application domain. In short, the application developer must include the "how" (knowledge of the device control) with the "what" (desired device behavior), which is not desirable. In addition to the application developer becoming responsible for device control issues, this approach inevitably introduces procedures that are tailored to a specific device, and many problems are only exposed when the application must be modified to make use of another device, (or set of devices), to accomplish the same task.

As the desired approach is to develop applications with "virtual device" interfaces, it is up to the device interface developer to provide the independent, yet integrated, functionality of the complex device. However, this often requires independent control channels for I/O, which are sometimes unavailable. For example, most video servers present two completely independent functions: 1) a "transport" (play/record functionality), and 2) a media management functionality. An interface user, (a scheduling/playout application), may want to manage the resources using a "system interface" and also cue and play clips using transport interfaces. That is, from the prospective of the client application, there are two (or more) discrete functionalities provided by separate devices. This interface scheme reduces the complexity of each device interface by restricting the problem domain to that of a single functionality, and thereby presents an opportunity to model the interface, and the client application, in an object orientated manner. However, this approach often presents a problem when independent control channels for I/O are not available for each operating device interface or when the target device limits the communication by its protocol implementation and/or by its physical/logical connections.

For example, the LOUTH (VDCP) protocol consists of a mixture of system (resource) and control (transport) commands. A VDCP device, therefore, provides several play/record (control) ports and a system port. However, the system port is only accessible via a control port. Thus, the interface developer is faced with the dilemma of having to present itself as both a "VTR" and a system resource manager. This complicates the interface by forcing modes of operation with priority impacts, and also complicates the application making use of the interface by requiring a knowledge of which interface is the system port.

Moreover, several major problems with the development of multiple device interfaces when they all operate on a single (physical) device communication connection, as each interface competes for a limited amount of communication, (and CPU), bandwidth. Device interfaces often operate in a quiescent state of "ready" with bursts of "high priority" and time critical activity. When more than one of such interfaces is operating simultaneously, there must be a way to arbitrate both, the maximum usage of the limited communications bandwidth, and the precise timing of time-critical messages, often at a "sub-field" resolution. These requirements present three major problems for device interface development, namely, 1. avoidance of process/thread priority inversion or contention; 2. precise timing of certain control messages; and 3. handling timing collisions for multiple control messages.

Priority inversion refers to the problem of a high priority interface executing a low priority task and taking precedence over a lower priority interface executing a high priority task. Dealing with priority inversion issues is difficult even in a real time operating system where process/thread priorities allow adjusting priorities. Indeed, priority adjustment at runtime is a very difficult and seldom successfully used method for handling the problem of multiple interfaces with bursts of "high priority" activity.

SUMMARY

In general, systems and methods according to present principles are provided for independently accessing and controlling discrete functionalities of a controlled device through separate virtual device interfaces that utilize a single shared deterministic I/O connection under control of a device I/O module. In one aspect, a method for controlling a device includes exposing a plurality of virtual device interfaces for a device, wherein each virtual device interface enables client control of a discrete function of the device, and controlling concurrent communication between the device and two or more virtual device interfaces operating on a single shared I/O connection using a device I/O interface. The device I/O module enables development of multiple device interfaces that can seamlessly and independently operate on a single (physical) device communication connection, wherein the device shared I/O module implements functions to arbitrate and coordinate I/O activity between the device interfaces and target device.

These and other exemplary embodiments, aspects, features, and advantages of the present invention will become apparent from the following detailed description of the preferred embodiments, which is to be read in connection with the accompanying drawings.

DETAILED DESCRIPTION

Exemplary systems and methods for accessing and controlling a device in a distributed computing environment through separate virtual device interfaces that can concurrently communicate with the associated device over a single shared I/O port will now be described in further detail with reference to FIGS. 1 and 2. It is to be understood that the exemplary systems and methods discussed herein can be implemented in various forms of hardware, software, firmware, special purpose processors, or a combination thereof. For example, device interfaces and APIs can be implemented in software as an application comprising program instructions that are tangibly embodied on one or more program storage devices (e.g., magnetic floppy disk, RAM, CD ROM, ROM, Flash memory, etc.) and executable by any computing device, machine or platform comprising suitable architecture. It is to be further understood that because some of the system components and method steps depicted can be implemented in software, the actual connections between the system components (or the process steps) can differ depending upon the manner in which the present invention is programmed.

Figure 1:
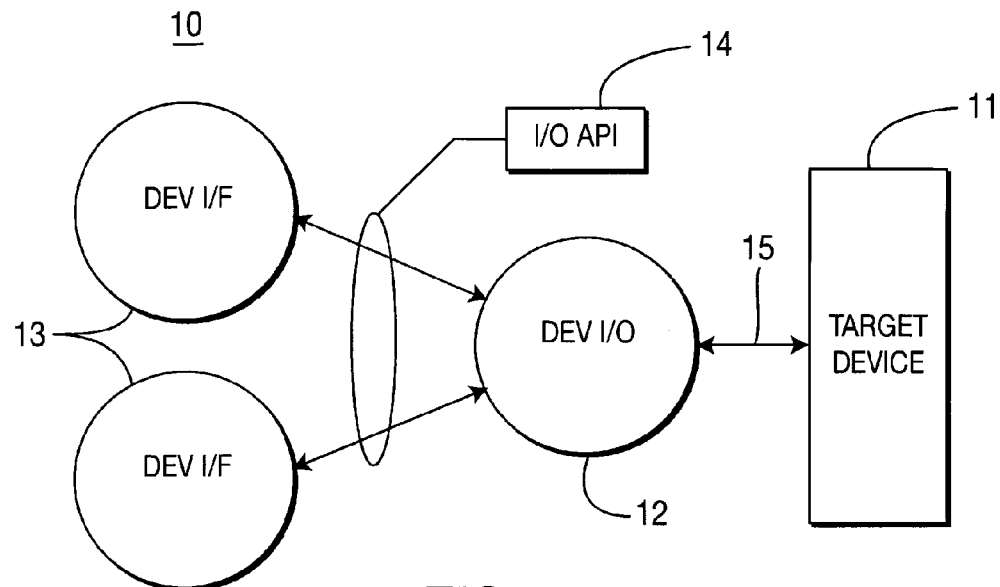
FIG. 1 is a high-level schematic block diagram of a system for controlling and accessing a physical device using a plurality of virtual device interfaces over a shared communications port, according to an exemplary embodiment of the present principles.

Referring now to FIG. 1, a high-level schematic block diagram is depicted of a system (10) for controlling and accessing a physical device using a plurality of virtual device interfaces over a shared communications port, according to an exemplary embodiment of the present principles. In general, FIG. 1 illustrates a controlled device (11), a device I/O module (12), a plurality of device interface modules (13) and an I/O API module (14). The various interfaces (12), (13) and (14) provide a framework under which clients (applications) can independently access and control discrete functionalities presented by the single controlled device (11) through separate virtual device control interfaces (13) that can concurrently send/receive messages to/from the device (11) over a single deterministic shared I/O connection (15) managed by the device I/O module (12).

In particular, each virtual device interface (13) associated with the device (11) exposes an interface to a set of abstract functions to access and control an independent, discrete function of the target device (11). The device interfaces (13) provide the necessary function commands that abstract the operating protocol (commands, control signals) of the device for access and control of a discrete function. The device interfaces (13) can concurrently communicate (send and receive messages) with the device (11) via the device I/O module (12), wherein each of the device interfaces (13) can simultaneously access (share) and communicate with the device I/O module (12) via the common I/O API (14). In one exemplary embodiment, the device I/O module (12) comprises a server front end that allows multiple clients (device interfaces (13)) to access the device I/O module (12) via the common I/O API (14), wherein the clients can register interest in all or part of resulting I/O activity during a session. The common I/O API module (14) allows a client using a device interface (13) to send timed (deferred) commands to the target device (11) via the device module (12). The device I/O module (12) comprises a back end device I/O interface that provides the interface functionality (socket, serial port, etc) to interface with the device (11) and send/receive messages to/from the target device (11) over a single shared I/O port (15). In this regard, the device I/O module (12) with the common I/O API module (14) operates as a shared I/O interface providing a many-to-one/one-to-many I/O interface.

The above exemplary embodiment of FIG. 1 is a high-level conceptual system framework for device control that can be implemented in various application environments and distributed computing systems. FIG. 1 further depicts a method for controlling a device according to present principles by exposing a plurality of virtual device interfaces for a device, wherein each virtual device interface enables client control of a discrete function of the device, and controlling concurrent communication between the device and two or more virtual device interfaces operating on a single shared I/O connection using a device I/O interface.

For instance, in the above mentioned example of video server applications, the device interfaces (13) can be configured to control independent functions such as (i) a "transport" (play/record) functionality and (ii) a media management functionality. An interface user, (a scheduling/playout application), can access and manage resources using a "system interface" and cue and play clips using a transport interface. From the perspective of the user, the virtual interface device scheme makes the single device access appear to be two (or more) separate devices.

In contrast to conventional schemes as discussed above where the target device limits the communication by a protocol implementation and/or by a physical/logical connection of the device which forces the interface and application developers to address I/O control and connectivity with device specific knowledge regarding the device communication protocol, the present principles provide solutions to these problem by using a shared device I/O module to implement functions for controlling a shared I/O connection between multiple independent interfaces.

In accordance with present principles, a shared device I/O module enables development of multiple device interfaces that can seamlessly and independently operate on a single (physical) device communication connection, wherein the device shared I/O module implements functions to arbitrate and coordinate I/O activity between the device interfaces and target device to achieve maximum usage of a limited amount of communications bandwidth, and precise timing of (time critical) messages, often at a "sub-field" resolution.

Figure 2:
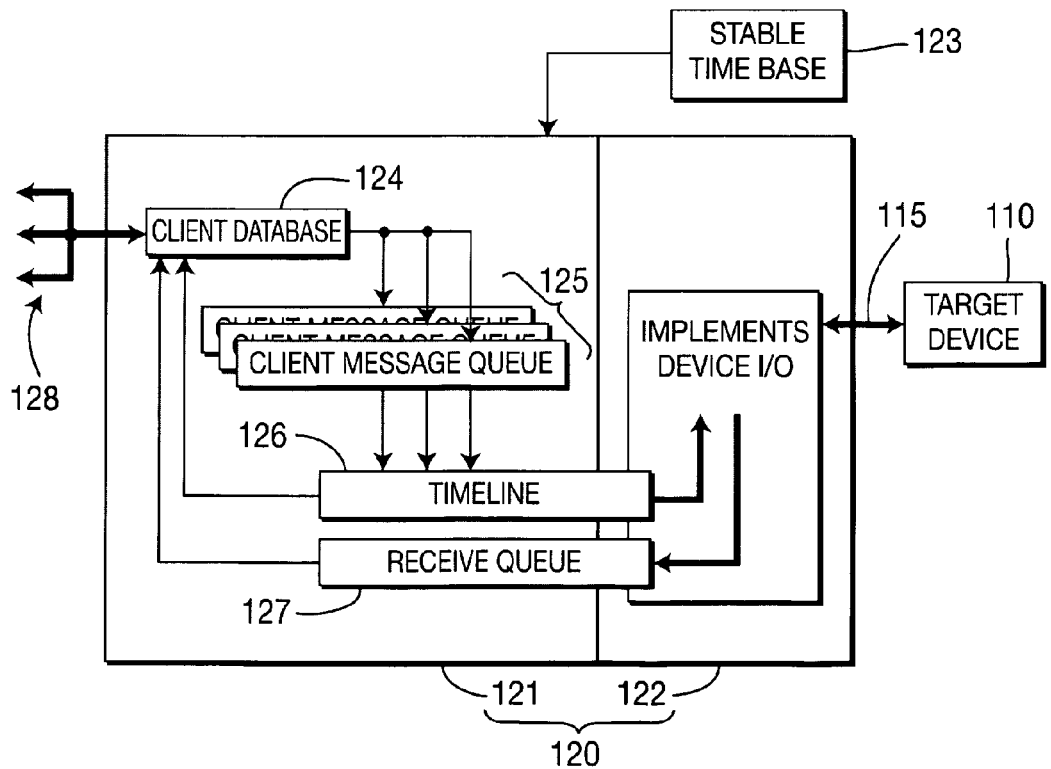
FIG. 2 is a schematic block diagram of a device I/O module according to an exemplary embodiment of the present principles.

FIG. 2 is a block diagram that schematically illustrates a framework of a device I/O module according to an exemplary embodiment of the invention. The device I/O module (120) comprises a front end interface (121) and an I/O port interface (122) and a stable time base (123), which provides a framework by which multiple device interfaces can establish one-to-one communication links (128) to the shared device I/O module (120) and concurrently and independently access a controlled device (110) over a single shared connection (115) to the controlled device (110). As explained below, the device I/O module (120) controls communications in a prioritized manner using a control scheme in which the device interfaces are assigned equal (run time) priority and priority assignment is on a message-level assignment and wherein a message timeline and advance collision detection functions are employed to delegate (combine) high priority activities at a constant priority and handle (arrange) the communications in a prioritized manner.

In particular, the front end interface (121) comprises a client database (124), a plurality of client message queues (125), a timeline (126) (or transmit queue) and receive queue (127). The client DB (124) is used to store client information for a given user session for which a client engages the controlled device, wherein such information includes user requests, and other session data associated with I/O activity and status for each client. The client DB (121) allows a client to register information and interest in all or a portion of the I/O events.

The front end interface (121) implements a message queuing process that temporarily stores incoming client messages from each client operating a given device interface into a corresponding one of the client message queues (125). The message queuing process takes messages from the client message queues (125) and places the messages into a timeline (126) (or transmit queue) where the messages are placed in order of time and priority based on a specification for the priority and timing of messages. The stable time base (123) provides a quantum of time with subdivisions as defined by the system (e.g., a video frame (with quarter-frame subdivisions). In this example, once every quarter frame, the content of the timeline (transmit) queue (126) is evaluated and relevant messages transmitted to the controlled device (110) via the shared I/O port interface (122) over the single I/O connection (115). The receive queue (127) collects responses from the shared I/O port interface (122) which are received from the controlled device (110), and copies the received message to individual client receive queues in accordance with the client's specification of interest.

The I/O API (14) includes (but is not limited to) a client form that allows one or more multiple clients to register their interest in all or some of the received messages, a specification for the priority and timing of messages, a request for received messages, timeline control and status, all under a framework that enables multiple clients to concurrently access, control and otherwise communicate with a controlled device. For instance, with regard to priority, the front end interface (121) assigns equal priority to virtual device interfaces executing tasks, and prioritizes messages from the virtual device interfaces based on the priority (assigned by the virtual device interface) of the message. The front end interface (121) implements a message-level priority scheme wherein messages are prioritized according to the type of message and/or the importance of an associated task. For instance, control messages and data messages are different types of I/O messages where pending control messages can be afforded higher priority to provide important control tasks, while data messages can be afforded lower priority. Moreover, messages can be assigned priority levels based on critical timing factors such as client requested deadlines, etc. By operating according to a message level priority scheme, the priority inversion problem associated with allowing a high priority interface to execute a low priority task, taking precedence over a lower priority interface executing a high priority task is eliminated.

Under a message level priority framework, the device I/O module (120) can control concurrent communication between a controlled device and a plurality of clients by placing messages in separate client queues associated with each client operating a virtual device interface, and moving messages from the client queues and placing the messages into a timeline in order of time and priority. Moreover, the ability to control concurrent communication is further supported by the front end interface (121) periodically determining the priority of messages in the timeline, and transmitting messages from the timeline according to priority. Furthermore, the front end interface (121) can support functionality for periodically determining a priority of messages in the timeline, detecting potential timing collisions exist for message transmission, and providing collision notification to the virtual device interfaces. Moreover, by adding a timeline for the transmit queue, it is possible to provide timely collision notification to the device interfaces to allow higher logic (such as, for example, a system controller application) to resolve the problem with the best compromise.

Although exemplary embodiments have been described herein with reference to the accompanying drawings, it is to be understood that the present system and method is not limited to those precise embodiments, and that various other changes and modifications can be affected therein by one skilled in the art without departing from the scope or spirit of the invention. All such changes and modifications are intended to be included within the scope of the invention as defined by the appended claims.

The invention claimed is:
1. A method, comprising the steps of:
providing a plurality of virtual device interfaces for a device, wherein each virtual device interface enables client control of a discrete function of the device;
placing messages in separate client queues associated with each client operating a virtual device interface;
moving messages from the client queues and placing the message into a timeline in order of time and priority;
periodically determining a priority of messages in the timeline;
detecting if potential timing collisions exist for message transmission;
providing collision notification to the virtual device interfaces; and
controlling concurrent communication between the device and two or more virtual device interfaces operating on a single shared I/O connection using a device input/output (I/O) interface.
2. The method of claim 1, further comprising the steps of:
assigning equal priority to virtual device interfaces executing tasks; and
prioritizing messages from the virtual device interfaces based on assigned priority.
3. The method of claim 1, further comprising the steps of:
periodically determining the priority of messages in the timeline; and transmitting messages from the timeline according to priority.

4. The method of claim 1, further comprising the step of:
using an I/O API (application programming interface) that enables a client to specify the priority and timing of messages for that client.

5. The method of claim 1, further comprising the step of:
using an I/O API (application programming interface) that enables a client to specify response messages received from the target device, which are to be provided to that client.

6. A non-transitory program storage device readable by a computer, tangibly embodying a program of instructions executable by the computer to perform method steps for controlling a device, the method steps comprising:
using a plurality of virtual device interfaces for a device, wherein each virtual device interface enables client control of a discrete function of the device;
controlling concurrent communication between the device and two or more virtual device interfaces operating on a single shared I/O connection using a device input/output (I/O) interface, wherein the instructions for controlling concurrent communication comprise instructions for:
placing messages in separate client queues associated with each client operating a virtual device interface;
moving messages from the client queues and placing the messages into a timeline in order of time and priority;
periodically determining a priority of messages in the timeline;
detecting if potential timing collisions exist for message transmission; and
providing collision notification to the virtual device interfaces.

7. The non-transitory program storage device of claim 6, wherein the instructions for controlling concurrent communication comprise instructions for:
assigning equal priority to virtual device interfaces executing tasks; and
prioritizing messages from the virtual device interfaces based on assigned priority.

8. The non-transitory program storage device of claim method of claim 6, wherein the instructions for controlling concurrent communication comprise instructions for:
periodically determining a priority of messages in the timeline; and
transmitting messages from the timeline according to priority.

9. The non-transitory program storage device of claim 6, further comprising instructions for using an I/O API (application programming interface) that enables a client to specify a priority or timing of messages for that client.

10. The non-transitory program storage device of claim 6, further comprising instructions for using an I/O API (application programming interface) that enables a client to specify response messages received from the target device, which are to be provided to that client.

11. A system, comprising:
a hardware component configured to interface with a plurality of virtual devices and a target device to concurrently control communications over a single connection between two or more of the virtual devices and the device, wherein the concurrent communications comprises the steps of:
placing messages in separate queues associated with each client operated virtual device interface;
moving messages from the client queues and placing the messages into a timeline in order of time and priority;
periodically determining a priority of messages in the timeline;
detecting if potential timing collisions exist for message transmission; and
providing collision notification to the virtual device interfaces.

12. The system of claim 11, further comprising:
a front end interface that interfaces with virtual devices and determines message queues for the virtual devices; and
an input/output (I/O) port interface that interacts with a target device based on the queued messages.

13. The system of claim 12, wherein the front end interface assigns equal priority to virtual devices executing tasks and prioritizes messages from the virtual devices based on assigned priority.

14. The system of claim 12, wherein the front end interface places the messages in the separate client queues associated with each client operating a virtual device interface, moves the messages from the client queues and places the messages into a timeline in order of time and priority.

15. The system of claim 14, wherein the front end interface periodically determines the priority of messages in the timeline and transmits messages from the timeline according to time and priority.

16. The system of claim 14, further comprising:
an I/O API (application programming interface) that enables the client to specify a priority and timing of messages for that client.

17. The system of claim 14, further comprising:
an I/O API (application programming interface) that enables the client to specify response messages received from the target device, which are to be provided to that client.

* * * * *